（12） United States Patent
Kudryavtsev et al.

(10) Patent No.: US 9,147,502 B2
(45) Date of Patent: Sep. 29, 2015

(54) METHOD OF RECYCLING SPENT NUCLEAR FUEL

(75) Inventors: Yevgeny Georgievich Kudryavtsev, Moscow (RU); Petr Mikhailovich Gavrilov, Zheleznogorsk (RU); Yury Alexandrovich Revenko, Zheleznogorsk (RU); Igor Alexandrovich Merkulov, Zheleznogorsk (RU); Vladimir Victorovich Bondin, Zheleznogorsk (RU); Vladimir Ivanovich Volk, Moscow (RU); Sergey Ivanovich Bychkov, Zheleznogorsk (RU); Vladimir Nikolaevich Alexeyenko, Zheleznogorsk (RU)

(73) Assignee: Federal Initary Enterprise "Mining and Chemical Combine", Zheleznogorsk, Krasnoyarsk Region (RU)

( * ) Notice: Subject to any disclaimer, the term of this patent is extended or adjusted under 35 U.S.C. 154(b) by 158 days.

(21) Appl. No.: 14/000,490

(22) PCT Filed: Mar. 5, 2012

(86) PCT No.: PCT/RU2012/000161
§ 371 (c)(1),
(2), (4) Date: Aug. 20, 2013

(87) PCT Pub. No.: WO2012/144933
PCT Pub. Date: Oct. 26, 2012

(65) Prior Publication Data
US 2014/0037518 A1 Feb. 6, 2014

(30) Foreign Application Priority Data

Apr. 20, 2011 (RU) .................. 201115665

(51) Int. Cl.
*G21F 9/32* (2006.01)
*C22B 60/02* (2006.01)
(Continued)

(52) U.S. Cl.
CPC .............. *G21F 9/32* (2013.01); *G21C 19/44* (2013.01); *G21C 19/48* (2013.01); *Y02W 30/882* (2015.05); *Y02W 30/884* (2015.05)

(58) Field of Classification Search
CPC ........ C01G 43/025; G21F 9/06; G21C 19/44; G21C 19/48; C22B 60/0204
See application file for complete search history.

(56) References Cited

U.S. PATENT DOCUMENTS

| 5,489,734 A | 2/1996 | Nagel et al. |
| 2011/0250108 A1 | 10/2011 | Collins et al. |
| 2012/0213658 A1 | 8/2012 | Aaron et al. |

FOREIGN PATENT DOCUMENTS

| EP | 1054413 A2 | 11/2000 |
| EP | 2701158 A1 | 2/2014 |

(Continued)

OTHER PUBLICATIONS

International Search Report mailed Aug. 9, 2012 for PCT/RU2012/000161.
(Continued)

*Primary Examiner* — Richard M Rump
(74) *Attorney, Agent, or Firm* — Fishman Stewart Yamaguchi PLLC

(57) ABSTRACT

The method concerns processing irradiated (spent) nuclear fuel (SNF), it is primarily aimed at isolating and trapping tritium, and can be used in nuclear power industry for treating SNF. This method provides for a two-phase voloxidation of a reaction mass using gas-air mixture, the reaction mass including fragmented uranium dioxide SNF elements with containers. The first phase is carried out at 400-650° C. in the presence of air and additional carbon dioxide. The second phase is carried out at 350-450° C. using a stream of an air-vapor mixture that can be oxygen-enriched. Both phases are carried out with a repeated mechanical activation of the reaction mass. Provided in the course of the voloxidation is the gas replacement at the hour rate of about 10-50 fold the reaction chamber gas volume. Before being introduced into the reaction chamber, the gas is preheated up to the chamber internal temperature.

13 Claims, 1 Drawing Sheet

(51) Int. Cl.
*G21C 19/44* (2006.01)
*G21C 19/48* (2006.01)

(56) References Cited

FOREIGN PATENT DOCUMENTS

| RU | 2122250 | C1 | 11/1998 |
|---|---|---|---|
| RU | 2268515 | C1 | 1/2006 |
| RU | 2303303 | C1 | 7/2007 |
| RU | 2459299 | C1 | 8/2012 |
| WO | WO-2012144933 | A1 | 10/2012 |

OTHER PUBLICATIONS

G. D. Delcul et al., Advanced head end for the treatment of used LWR fuel. OECD Nuclear Energy Agency. 11th Information Exchange Meeting on Actinide and Fission Product Partitioning and Transmutation. Hyatt at Fisherman's Wharf, San Francisco, California, Nov. 1-5, 2010, p. 2 [online] Found from Internet: <URL:http://www.oecd-nea.org/pt/iempt11/documents/IV-6_OECDNov2011FR.pdf>.

T. R. Thomas, AIROX Nuclear Fuel Recycling and Waste Management, Global 93, Conf. Seattle, Washington US, Dec. 17, 2009, 1993, pp. 722-728 [online] Found from Internet: <URL:http://www.osti.gov/energycitations/servlets/purl/10163654-6kPW7W/10163654.pdf>.

B. R. Westphal et al., Effect of Process Variables During the Head-End Treatment of Spent Oxide Fuel, Idaho National Laboratory, INL/CON-06-116055, Preprint, 2006 [online] Found fromInternet: <URL:http:www.inl.gov/technicalpublications/Documents/3867729.pdf>, Chapters II, III, C.

English Abstract for WO2012144933A1.
English Abstract for RU2459299C1.
English Abstract for RU2268515C1.
English Abstract for RU2122250C1.
English Abstract for EP1054413A2.

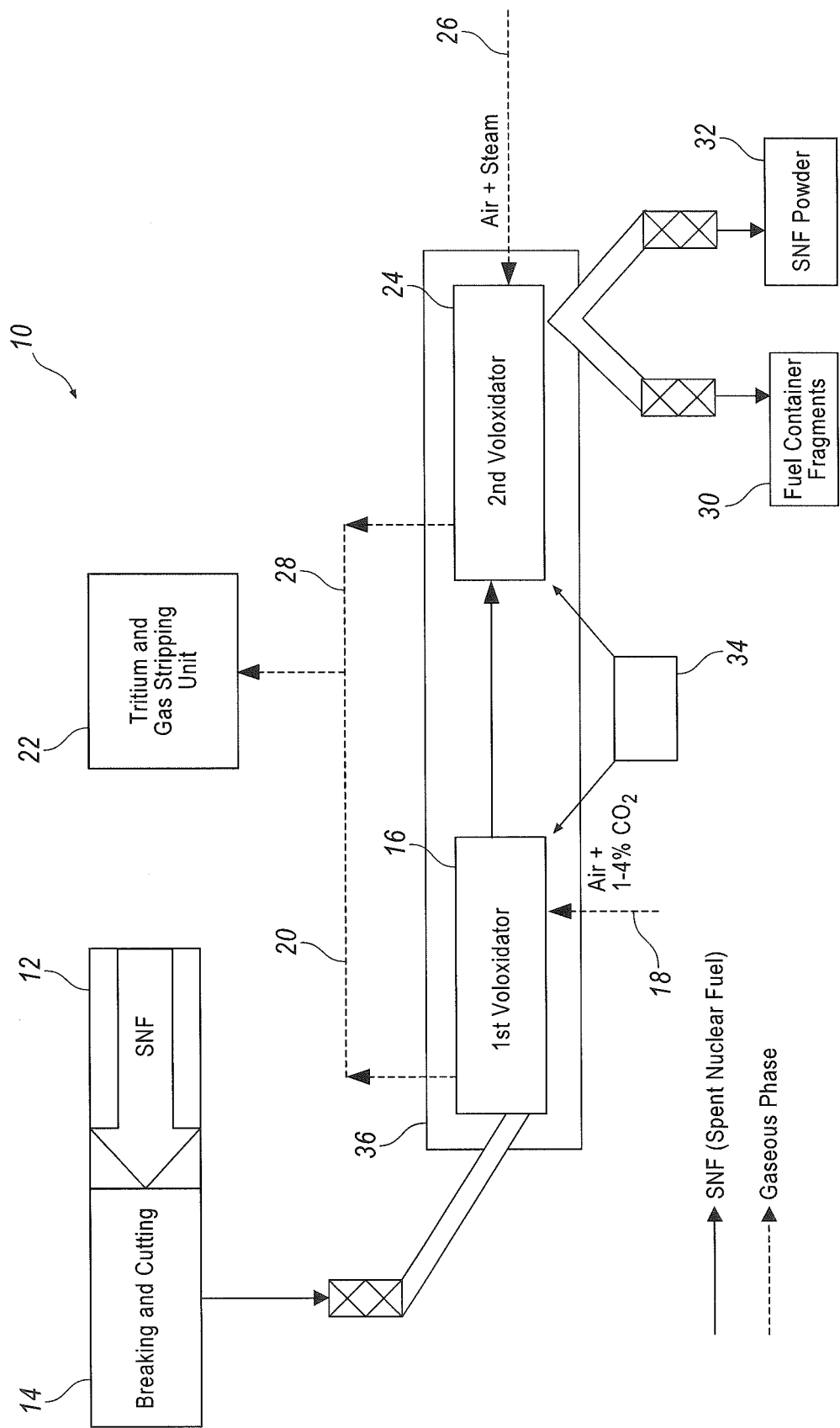

METHOD OF RECYCLING SPENT NUCLEAR FUEL

CROSS-REFERENCE TO RELATED APPLICATIONS

This application is a continuation-in-part U.S. National Phase application of a PCT application PCT/RU2012/000161, filed on Mar. 5, 2012 and claiming priority of a Russian Federation patent application RU2011115665 filed on Apr. 20, 2011, the disclosure of the above-mentioned PCT and Russian applications being incorporated herein in its entirety by reference.

TECHNICAL FIELD

The following disclosure generally relates to methods of recycling irradiated (spent) nuclear fuel (SNF) aimed at the separation and trapping of beta-active radionuclide tritium prior to dissolving the SNF, and can be used in nuclear power industry in the process of recycling the SNF of nuclear reactors.

DESCRIPTION OF PRIOR ART

Currently, aqueous extraction is the most widespread method of recycling SNF. However, failure to purposefully remove tritium at the initial stage of recycling SNF, prior to its dissolution, leads to spreading tritium practically into all of the aqueous technological products of the process and thus complicates recycling liquid radioactive waste (LRW) to a great extent resulting in the increase of the volume of LRW.

Known in the art are methods of the preliminary (prior to dissolving SNF) removal of gaseous and volatile fission products at the outset of SNF recycling, at the stage of the exposure and voloxidation, which is performed through oxidizing treatment of fuel in the stream of oxygen or air at high temperatures (see *Radiochemical treatment of nuclear fuel from NPP*.-M.: Energoatomizdat, 1983, p. 185), or by inert gas (helium) or hydrogen blowdown at 1500° C. or less (Trans. Amer. Nucl. Soc. 1981, vol. 39, p. 419-421; Radiochimica, 1981, vol. 29, No. 1, p. 153-157).

The required level of tritium removal (99% or more) in the helium or hydrogen blow-down of the reactor containing fragmented fuel elements is obtained over a long heating (during 24 hours) of a reaction mixture at 1000° C. or more. This creates additional problems relating to making the reactor, and handling fission products as their compounds (comprising cesium, silver, ruthenium, iodine, technetium, antimony, etc.) start to evaporate at high temperature and condense in various parts of equipment. This, in its turn, necessitates performing repeatable liquid decontamination of the equipment which results in the formation of additional hot LRW. Also resulting from such a high temperature treatment, is an increase up to 1.5% in the amount of nitric-acid-insoluble plutonium.

On oxidizing treatment of SNF based on uranium dioxide a number of phase transitions of uranium oxides, when heated, occurs:

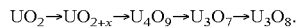

Since different oxides have different types of crystal lattice, added with mechanical effect on fuel composition it causes the destruction of fuel pellets to fine state (1-10μ), and provides favorable conditions for releasing volatile and gaseous fission products (A. T. Agheyenkov, S. E. Bibikov, E. M. Valuyev et al.//Atomic energy, 1973, vol. 35, No. 5, pp. 323-325).

Also known is a method of high temperature oxidizing treatment of SNF fragments at 480-600° C. in the presence of air or oxygen, the amount of tritium removed from the SNF being 99% (G. D. DelCul, et al., "Advanced head end for the treatment of used LWR fuel." OECD Nuclear Energy Agency, 11th Information Exchange Meeting on Actinide and Fission Product Partitioning and Transmutation, Hyatt at Fisherman's Wharf, San Francisco, Calif., 1-5 Nov. 2010).

By its essence and the effect attained thereby, this method is most closely related to that described herein and is for that reason chosen as a prototype. The prototype's disadvantage lies in an inadequate extent of tritium stripping from the SNF and in rather high degree of cesium sublimation and further carrying it over that poses additional problems associated with decontaminating and redistributing hot fission products throughout the stages of SNF recycling.

SUMMARY

Therefore, the need exists of increasing the extent of the removal of tritium from the fuel composition and decreasing the extent of the sublimation of cesium compounds using air with the addition of carbon dioxide and water vapors.

This object is achieved by providing a process of SNF recycling that is performed in an oxidizing atmosphere in two phases. The first phase is carried out at 400-650° C. during 60-360 minutes in an air medium additionally comprising carbon dioxide (1-4 vol. %). The second phase is carried out at 350-450° C. during 30-120 minutes in an air or oxygen-enriched medium that comprises water vapor in the amount, corresponding to a dew point of the gas-vapor mixture at 30-40° C. The air at the second phase can be oxygen-enriched. In addition, both phases are carried out with a repeated mechanical activation—continuous or periodic—of the reaction mass. A gas flow hourly rate at each phase corresponds to 10-50 full replacements of the reaction chamber gas volume. In order to decrease the whole time of recycling and achieve the required extent of the voloxidation of the SNF level, before being introduced into the reaction chamber, the gas is heated up to a temperature of the chamber interior, i.e., up to 400-650° C. at the first phase and up to 350-450° C. at the second phase, respectively.

BRIEF DESCRIPTION OF DRAWINGS

The only FIGURE illustrates an example of an installation for implementing the method disclosed herein.

DESCRIPTION OF THE EMBODIMENT

According to modern refined thermodynamic calculations, tritium is present in SNF in three chemical species: $T_2$, $T_2O$ (HTO) and CsOT. As will be shown below, this determines the essence of the method being described herein, particularly oxidative recrystallization (voloxidation) of SNF.

Referring now to the FIGURE showing an installation 10 for the realization of the method in question, SNF 12 subject to recycling arrives to a unit 14 for breaking and cutting spent fuel elements and their jackets (containers). The fragmented SNF enters a 1st reaction chamber (voloxidator) 16. Taking place in it at the first phase of SNF recycling is breaking uranium dioxide structure, oxidizing tritium to tritium water, and removing the main body of tritium including that contained in tritiated cesium hydroxide according to the reaction

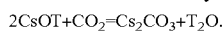

The shift of the reaction equilibrium to the right is achieved by the increased (of 1-4%), as compared with that in the ambient air, content of carbon dioxide in the air stream supplied via channel 18 to the chamber 16. Formed in this reaction is cesium carbonate which is kept, because of its non-volatility, from entering an exit gas line 20 to a tritium and gas stripping unit 22. The first phase of voloxidation takes place at 400-650° C. during 60-360 min. The duration of the process at the first and second phases is subject to various factors such as the extent of SNF burnup; the type of the SNF—for example, from a fast or slow neutron reactor; using ambient air or oxygen-enriched one; etc.

At the second phase, carried out in a $2^{nd}$ reaction chamber (voloxidator) 24 at 350-450° C. during 30-120 min, removal of tritium water ($T_2O$; HTO) adsorbed with great strength at the defects and dislocations of the grid of oxidized products takes place in accordance with the reactions of isotope exchange and interaction of gaseous (G) and solid (S) phases of the type of:

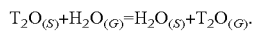

$$T_2O_{(S)} + H_2O_{(G)} = H_2O_{(S)} + T_2O_{(G)}.$$

The removal is made possible by submitting air or oxygen-enriched medium to the chamber 24 via a line 26, the air or medium comprising water steam in the amount which corresponds to the dew point of the water-steam mixture at 30-40° C. Adding oxygen to the air has influence on the duration of the process and its effectiveness in case of using SNF with different burnup.

Products of the second phase include exiting gases in a line 28, fuel container fragments 30, and SNF powder 32. The exiting gases comprise tritium in the form of tritium water, and it can be further removed therefrom by various ways which include, but are not limited to, zeolite absorption, isotope exchange column, etc. In the course of further reprocessing the SNF (outside the scope of the present disclosure), cesium remaining in the SNF after voloxidation is supplied into a line of high-level solid waste (not shown) and then to a vitrification stage.

During the first and second phases of the treatment, the SNF is exposed to a repeated mechanical activation that can be continuous or periodic. The activation pursues the goal of renewing the surfaces of SNF particles and thus improving access of the reactant gas to the surfaces. Fragments of the SNF element containers function as stirring means upon the activation. The activation can be performed in various ways depending on the design of the reaction chamber. If the chamber is made as a rotary furnace (retort), the mechanical activation takes place upon continuous or periodic revolving thereof. In case of a static furnace (retort), shaking the basket with the reaction mass is carried on with the use, for example, of a combination of a rod and a flexible seal. By convention, the mechanical activation means are assigned reference number 34 in the FIGURE.

It should be noted that both phases can take place in the same reaction chamber shown in the FIGURE by convention with reference number 36.

Technical result of the method consists in achieving the level of tritium stripping of no less than 99.9%, and decreasing the carryover of cesium by voloxidation gaseous products.

An Example of Implementing the Method.

Irradiated fuel voloxidation modes were tested on fuel element fragments of 32 mm in length (VVER-1000 SFA from Balakovskaya NPP, uranium burn up—53 GWD/t after cooling over 14 years). A voloxidation level (a mass of broken-up fuel) was determined by a weight method. Tritium was tested using SKS-07P-B11 liquid-scintillation equipment.

In order to compare the prototype method and the claimed method, two tests were carried out for the same voloxidation period of 390 min. In the first test, fragments of the fuel elements were voloxidized at an air atmosphere at 550±50° C., while the sample holder was shaken at a rate of 60 $\text{min}^{-1}$. In the second test, the treatment was conducted in two phases. The first phase was carried out at a temperature of 550±50° C. for 300 minutes in air additionally containing carbon dioxide in the amount of 1-4 vol. %, the mixture of air and carbon dioxide being preheated up to 550±50° C.; the second phase was conducted at a temperature of 350-450° C. during 90 minutes in an oxygen-rich medium containing water vapor in the amount corresponding to a dew point of the gas-vapor mixture at 30-40° C. At the latter phase, before having been introduced into the reaction chamber, the gas-vapor mixture was preheated up to 350-450° C. A gas flow rate at each phase was set at about 30 full replacements of the reaction chamber gas volume per hour.

The degree of voloxidation of the fuel composition in both tests was 99%. In test #2, the degree of tritium removal from irradiated fuel and of carryover of cesium were 99.97% and less than 0.1%, respectively. In test #1, these values were 98% and 1.5%, respectively.

Though the foregoing description, for purposes of explanation, used specific nomenclature to provide a thorough understanding of the invention, it will be apparent to one skilled in the art that specific details are not required in order to practice the invention. Thus, the foregoing descriptions of specific embodiments of the invention are presented for purposes of illustration. They are not intended to be exhaustive or to limit the invention to the precise forms disclosed; obviously, various modifications are possible in view of the above disclosure. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method of volumetric oxidative treatment of spent nuclear fuel (SNF) of uranium dioxide, the method comprising thermal processing a reaction mass of SNF element fragments in oxidative environment, said thermal processing being carried out in at least one reaction chamber in two phases, the first phase being performed at 400-650° C. for 60-360 minutes in the gas stream of air additionally comprising carbon dioxide in the amount of 1-4 volume %, the second phase being performed at 350-450° C. for 30-120 minutes in the gas stream of air that includes water steam in the amount corresponding to the dew point of gas-vapor mixture at 30-40° C., the both phases being performed with a repeated mechanical activation of the reaction mass.

2. The method according to claim 1, wherein an hourly rate of the gas stream at said first and second phases is about 10-50 full exchanges of a reaction chamber volume at each phase.

3. The method according to claim 1, further providing preheating the gas stream up to an internal temperature of the at least one reaction chamber before the gas stream enters the at least one reaction chamber at said first phase and second phase, respectively.

4. The method according to claim 1, wherein the gas stream of air at the second phase is oxygen enriched.

5. The method according to claim 1, wherein the at least one reaction chamber includes two reaction chambers, the first phase being carried out in one of the two reaction chambers, the second phase being carried out in another of the two reaction chambers.

6. A method of volumetric oxidative treatment of spent nuclear fuel (SNF) of uranium dioxide, the method comprising thermal processing a reaction mass of SNF element fragments in oxidative environment, said thermal processing being carried out in at least one reaction chamber in two phases, the first phase being performed at 400-650° C. for 60-360 minutes in the gas stream of air additionally comprising carbon dioxide in the amount of 1-4 volume %, the second phase being performed at 350-450° C. for 30-120 minutes in the gas stream of air that includes water steam in the amount corresponding to the dew point of gas-vapor mixture at 30-40° C., an hourly rate of the gas stream being about 10-50 full exchanges of the at least one reaction chamber volume at each phase, the both phases being performed with a repeated mechanical activation of the reaction mass.

7. The method according to claim 6, further providing preheating the gas stream up to an internal temperature of the at least one reaction chamber before the gas stream enters the at least one reaction chamber at said first phase and second phase, respectively.

8. The method according to claim 6, wherein the gas stream of air at the second phase is oxygen enriched.

9. The method according to claim 6, wherein the at least one reaction chamber includes two reaction chambers, the first phase being carried out in one of the two reaction chambers, the second phase being carried out in another of the two reaction chambers.

10. A method of volumetric oxidative treatment of spent nuclear fuel (SNF) of uranium dioxide, the method comprising thermal processing a reaction mass of SNF element fragments in oxidative environment, said thermal processing being carried out in a reaction chamber in two phases, the first phase being performed at 400-650° C. for 60-360 minutes in the gas stream of air additionally comprising carbon dioxide in the amount of 1-4 volume %, the second phase being performed at 350-450° C. for 30-120 minutes in the gas stream of air that includes water steam in the amount corresponding to the dew point of gas-vapor mixture at 30-40° C., the both phases being performed with a repeated mechanical activation of the reaction mass, the gas stream being preheated up to an internal temperature of the reaction chamber before the gas stream is used at said first phase and second phase.

11. The method according to claim 10, wherein the gas stream of air at the second phase is oxygen enriched.

12. The method according to claim 10, wherein an hourly rate of the gas stream is about 10-50 full exchanges of the reaction chamber volume at each phase.

13. The method according to claim 10, wherein the reaction chamber includes a first and a second reaction chambers, the first phase being carried out in the first reaction chamber and the second phase being carried out in the second reaction chamber.

* * * * *

UNITED STATES PATENT AND TRADEMARK OFFICE
CERTIFICATE OF CORRECTION

| | |
|---|---|
| PATENT NO. | : 9,147,502 B2 |
| APPLICATION NO. | : 14/000490 |
| DATED | : September 29, 2015 |
| INVENTOR(S) | : Kudryavtsev et al. |

It is certified that error appears in the above-identified patent and that said Letters Patent is hereby corrected as shown below:

On the Title page, item (73)

Please change the word "Initary" to "Unitary" in the Assignee's name.

It should read as follows:

Federal Unitary Enterprise "Mining and Chemical Combine"

Signed and Sealed this
Sixteenth Day of February, 2016

Michelle K. Lee
*Director of the United States Patent and Trademark Office*